UNITED STATES PATENT OFFICE.

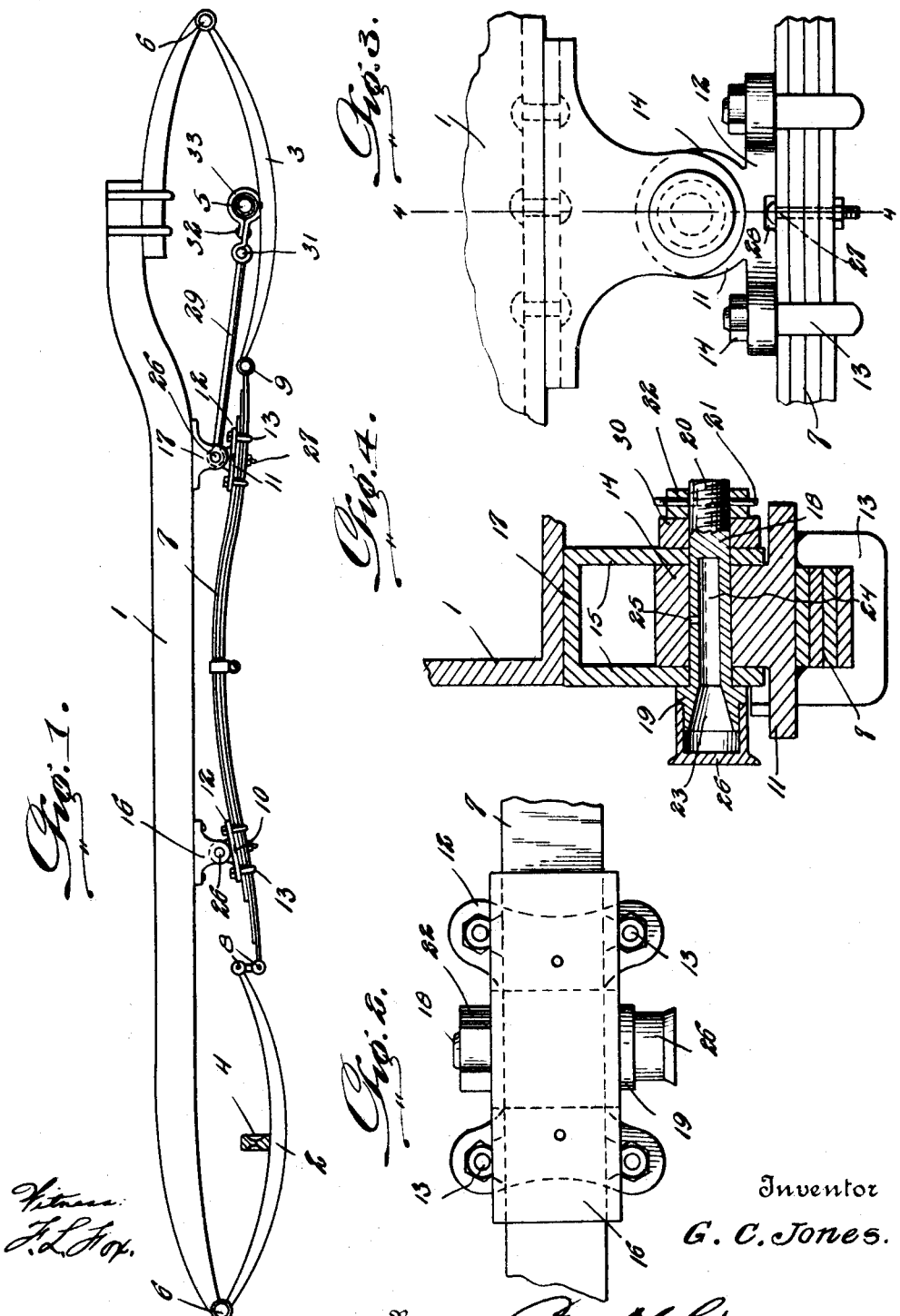

GEORGE CHESTER JONES, OF BROWNWOOD, TEXAS.

AUTOMOBILE-SPRING.

1,383,723.  Specification of Letters Patent.  Patented July 5, 1921.

Application filed June 30, 1920. Serial No. 392,995.

*To all whom it may concern:*

Be it known that I, GEORGE C. JONES, a citizen of the United States, residing at Brownwood, in the county of Brown and State of Texas, have invented new and useful Improvements in Automobile-Springs, of which the following is a specification.

This invention relates to automobile springs, and particularly to novel means for suspending the front and rear springs of an automobile and cushioning and absorbing the shocks falling thereon, whereby an easier riding action is obtained and danger of breakage of the usual front and rear springs reduced to the minimum.

The primary object of the invention is to provide at each side of the frame or chassis of the vehicle a centrally disposed shock absorbing spring to which the front and rear main springs of the vehicle are connected, said shock absorbing spring being so coupled to the main springs as to permit said main springs to have their usual cushioning actions, while at the same time taking up and absorbing all excess shocks and strains falling upon said main springs in a reliable and efficient manner.

A further object of the invention is to provide a central shock-absorbing spring of the character and for the purpose described which is pivotally mounted to permit independent motions of the ends thereof connected with the respective main springs, and which is also adapted to bow or flex and to have longitudinal or extensile motion, so as to permit varying degrees of amplitude of motion of the main springs in their working actions.

A still further object of the invention is to provide simple, reliable and efficient means for additionally sustaining and bracing the rear main spring, while permitting flexing motions thereof.

The invention consists of the features of construction, combination and arrangement of parts, hereinafter fully described and claimed, reference being had to the accompanying drawing, in which:

Figure 1 is a side elevation showing the application of the invention to the main springs and one of the side bars of an automobile chassis or frame.

Fig. 2 is a top plan view of one of the supporting brackets, the shock absorbing spring and coöperating parts.

Fig. 3 is a side elevation of a portion of the chassis, one of the supporting brackets, a portion of the shock absorbing spring and the pivotal connection between said spring and the bracket.

Fig. 4 is a transverse section on the line 4—4 of Fig. 3.

Referring to the drawing, 1 designates one of the side bars of the chassis or frame of an automobile, and 2 and 3 respectively designate the front and rear main springs disposed at such sides of the frame, and to which the front and rear axles are connected in the usual or any suitable manner. 4 is the front axle which is clipped or otherwise suitably secured to the front main springs. 2 and 5 is the rear axle which is supported by the rear main springs 3 in accordance with any of the methods commonly employed. These springs 2 and 3, as shown, are of the semi-elliptic type and are pivotally coupled at their outer ends, as indicated at 6, to the opposite extremities of the frame bar 1, the said pivotal connections 6 being preferably of special construction as hereinafter described.

Disposed at each side of the vehicle beneath each chassis bar 1 is a central and longitudinally disposed shock absorbing spring 7. This spring may be and preferably is of the leaf type, and composed of any desired number of laminations or sections, and as shown said spring is also bowed or of semi-elliptical formation, and has its convex side facing upwardly and its concave side facing downwardly. The forward end of the spring 7 is coupled by the pivot joint members 8 to the inner or rear end of the front spring 2 while the rear end of the spring 7 is pivotally coupled, as at 9, to the inner or front end of the spring 3, these pivotal connections 8 and 9, like the pivotal connections 6, being also preferably of special construction as hereinafter fully set forth.

Engaging the spring 7 at a distance inwardly from the front and rear ends thereof are clips 10 and 11. These clips lie a sufficient distance inwardly of the front and rear ends of the spring 7, to which the springs 2 and 3 are pivotally coupled, to permit the springs 2 and 3 and the adjacent portions of the spring 7 to have an ample degree of independent flexibility up to a certain degree without distorting the body portion of the spring 7. The clips 10 and 11 are substantially similar in construction, each comprising a clip plate 12 bearing against one side of the spring 7 and connected thereto by U-bolts 13 and nuts 14, said U-bolts embracing said spring, whereby the clips are secured to the spring. Each of these clip plates 12 is formed with an upstanding knuckle or eye 14, and the knuckles or eyes 14 of the clip plates of the respective clips 10 and 11 are arranged to fit between the depending side plates 15 of bifurcated brackets 16 and 17, bolted, riveted or otherwise secured to the underside of the frame bar 1. The knuckle or eye 14 and side plates 15 of the bracket are apertured for the passage of a bolt 18, pivotally connecting the clip with the bracket member, and one end of this bolt is formed with a flanged head 19 bearing against the outer side of one of the bracket plates 15, while the opposite end of the bolt is threaded, as indicated at 20, to receive a nut 21 locked in fixed position by a cotter pin 22 or the like, whereby the bolt is secured against displacement. Each bolt 18 has its head portion hollowed to form a socket 23 and its shank portion bored to provide a channel or passage 24 with which communicates a radial outlet 25 leading to the surface of the shank of the bolt. The head portion 19 is also suitably formed to receive a cap 26 forming with the conical socket 23 and channel 24 a grease cup or reservoir for grease or other lubricant which may be conveniently packed therein upon removing the cap 26. The cap in practice may be frictionally fitted sufficiently tight upon the head 19 to prevent its casual loss or displacement, and it will be understood that in the working movements of the parts of the pivot joint the lubricant contained within the grease cup will feed through the outlet 25 to the engaging surfaces of the bolt, knuckle and bracket, thus keeping said surfaces thoroughly lubricated to provide for a smooth and easy pivotal motion of the parts upon one another in the working actions of the springs. In practice the parts of the pivotal connections 6, 8 and 9 embody pivot bolts 18 and coöperating parts of the construction defined, forming grease cups or lubricators for automatically supplying grease or other lubricant to the surfaces of the pivotal connecting members, whereby squeaking will be prevented and wear and tear upon the parts of the pivot joints materially reduced.

The construction of the parts of the clip 10 engaging the front end of the spring 7 is such as to secure a comparatively loose engagement of said clip 10 with such end of the spring, whereby said end of the spring is adapted to slide backward and forward to a certain degree through the U-bolts 13 forming part of said clip and between said bolts and the clip plate 12 of this clip structure. The rear end of the spring 7 is, however, designed to be rigidly fixed to the clip 11, and the U-bolts 13 of this clip member 11 may therefore be drawn tight so as to firmly embrace such end of the spring. In addition, the rear end of the spring is preferably provided with a stop member 27 in the form of a bolt extended therethrough, said bolt having a headed end arranged to engage a recess 28 formed in the clip plate 12 of said clip member 11, whereby any tendency to longitudinal movement of the spring 7 through the U-bolts 13 of the clip will be prevented or such movement restricted to a minimum degree. The purpose of this construction will be hereinafter described.

It will be understood from the foregoing description that in the travel of the front and rear wheels of the vehicle over irregular surfaces, each spring 2 and 3 is adapted to have independent vertical pivotal and flexing movements, without transmission of strain from the spring 2 to the spring 3 or vice versa. Also it will be seen that whenever any unusual shocks or jars fall upon either the spring 2 or the spring 3, the adjacent end or ends of the spring 7 connected therewith is adapted to have pivotal motion on the pivotal connections coupled to the respective brackets 16 and 17, in which pivotal motions the spring 7 will be flexed to absorb and cushion and take up such shocks or jars. It will, of course, be understood that in its shock absorbing actions, the ends of the spring 7 may be pivotally moved and flexed to a greater or less extent for shock absorbing actions transmitted from the springs 2 and 3, or that the entire spring 7 may have flexing motion to cushion and absorb any excessive shocks or jars. When strain falls upon the spring 7 from the rear spring 3, it will be understood that this will be absorbed by pivotal motion of the rear end of the spring and a flexing motion of such end of the spring, and that if violent shocks or jars fall upon the spring 3 the body of the spring 7 will be moved downwardly or flattened out from a curved form, the spring thus being linearly extended and permitted to slide through the clip member 10 to compensate therefor, and the jointed connection 8 permitted to have such action without transmitting strain to the spring 2. Ordinary shocks or jars falling upon the spring 2 will be taken up and absorbed by the pivotal motion of the forward end of the spring 7 and by a bowing motion of the forward portion of said spring, such end of the spring also being permitted to slide through the clip 10 in its cushioning actions to allow flexing action of the spring 7 in an obvious manner. When severe strain falls upon the spring 2, the spring 7 may bow and contract or expand to any degree required to absorb shock, the forward end of the spring 7 sliding through the clip 10 and the latter having pivotal motion on the bracket 16 to premit ready and easy action of the spring 7 in its shock absorbing movements. Hence it will be apparent that easy cushioning actions of the springs 2 and 3 will be permitted, while any excessive jars or shocks falling upon said springs liable to cause damage thereto or breakage thereof, will be taken up and absorbed by the spring 7, thus insuring easier riding of the vehicle and its capability to travel over rough roads with greater comfort to the occupants of the vehicle and with less liability of damage to the springs or other parts of the running gear of the vehicle.

In order to brace each spring 3 and prevent any tendency to violent oscillations thereof, as well as to reduce corresponding movements of the rear axle 5, a bracing arm or motion limitation lever 29 is provided at each side of the vehicle for coöperation with each spring 3. Said arm or lever 29 is formed at its forward end with an eye 30 which pivotally engages the bolt 18 associated with the clip 11 and bracket member 17 and said arm or lever is coupled at is rear end by a pivot bolt 31 to a coupling member 32 having a sleeve 33 embracing the rear axle 5, forming a joint allowing certain degrees of angularities of movement between the lever and the rear axle. The levers 29 are adapted to allow ample degrees of movement of the springs 3 and axle 5, while bracing the same against excessive shocks and jars and instituting a certain degree of resistance to undue play or tendency to oscillation of the springs when flexing motions thereof of a violent character are set up. The pivot members 31 may be of the lubricating bolt type previously described and the sleeve 33 may be suitably constructed to supply a lubricant between the same and the surface of the axle 5 so as to insure ready and easy movements thereof in the working actions of the parts.

Having thus fully described my invention, I claim:

1. In a spring suspension for automobiles, front and rear axle supporting springs, and an intermediate shock absorbing spring, said shock absorbing spring being pivotally connected adjacent its ends to the vehicle frame and pivotally coupled at its ends to said front and rear springs.

2. In a spring suspension for automobiles, front and rear axle supporting springs, and a longitudinally bowed intermediate shock absorbing spring, said shock absorbing spring being pivotally coupled to the frame of the vehicle and pivotally coupled at its opposite ends to the front and rear springs.

3. In a spring suspension for automobiles, front and rear semi-elliptic axle supporting springs, and a longitudinally bowed intermediate shock absorbing spring common to said front and rear springs, said shock absorbing spring being pivotally coupled adjacent its ends to the frame of the vehicle and being pivotally coupled at its extremities to the inner ends of said front and rear springs.

4. In a spring suspension for automobiles, front and rear semi-elliptic axle supporting springs, each jointed at its outer end to the frame of the vehicle, and an intermediate longitudinally extending bowed shock absorbing spring, said shock absorbing spring being pivotally coupled adjacent its ends to the frame of the vehicle and pivotally coupled at its extremities to the inner ends of the front and rear springs, the pivotal connection between the front end of the shock absorbing spring and rear end of the front spring being adapted for swinging movements to permit lineal motion of the shock absorbing spring.

5. In a spring suspension for automobiles, a frame, front and rear bracket members secured thereto, front and rear axle supporting springs pivotally coupled at their outer ends to the frame, a longitudinally bowed intermediate shock absorbing spring pivotally coupled at its ends to the inner ends of the front and rear springs, and pivotal connections between the shock absorbing spring and said brackets on opposite sides of the transverse center of said shock absorbing spring.

6. In a spring suspension for automobiles, a frame, front and rear axle supporting springs, a rear axle supported by the rear supporting springs, a longtiudinally bowed shock absorbing spring pivotally coupled at its ends to the inner ends of the front and rear supporting springs, pivotal connections between said shock absorbing spring and the frame, and a bracing element forming a pivotal connection between one of the aforesaid pivotal connections of the shock absorbing spring and the rear axle.

7. In a spring suspension for automobiles, a frame, front and rear axle supporting springs pivotally coupled at their outer ends to the frame, a longitudinally bowed shock absorbing spring pivotally connected at its ends to the inner ends of the front and rear springs, and pivotal connections between the shock absorbing spring and the frame lying between the transverse center of said spring and the ends thereof.

8. In a spring suspension for automobiles, front and rear axle supporting springs, an intermediate longitudinally bowed shock absorbing spring pivotally coupled to the first named springs, and pivotal supports for the ends of the shock absorbing spring connecting the same with the frame of the vehicle, each of said pivotal supports including a pivotal element of hollow form provided with a lubricant storage and supply reservoir.

In testimony whereof I affix my signature.

GEORGE CHESTER JONES.